UNITED STATES PATENT OFFICE.

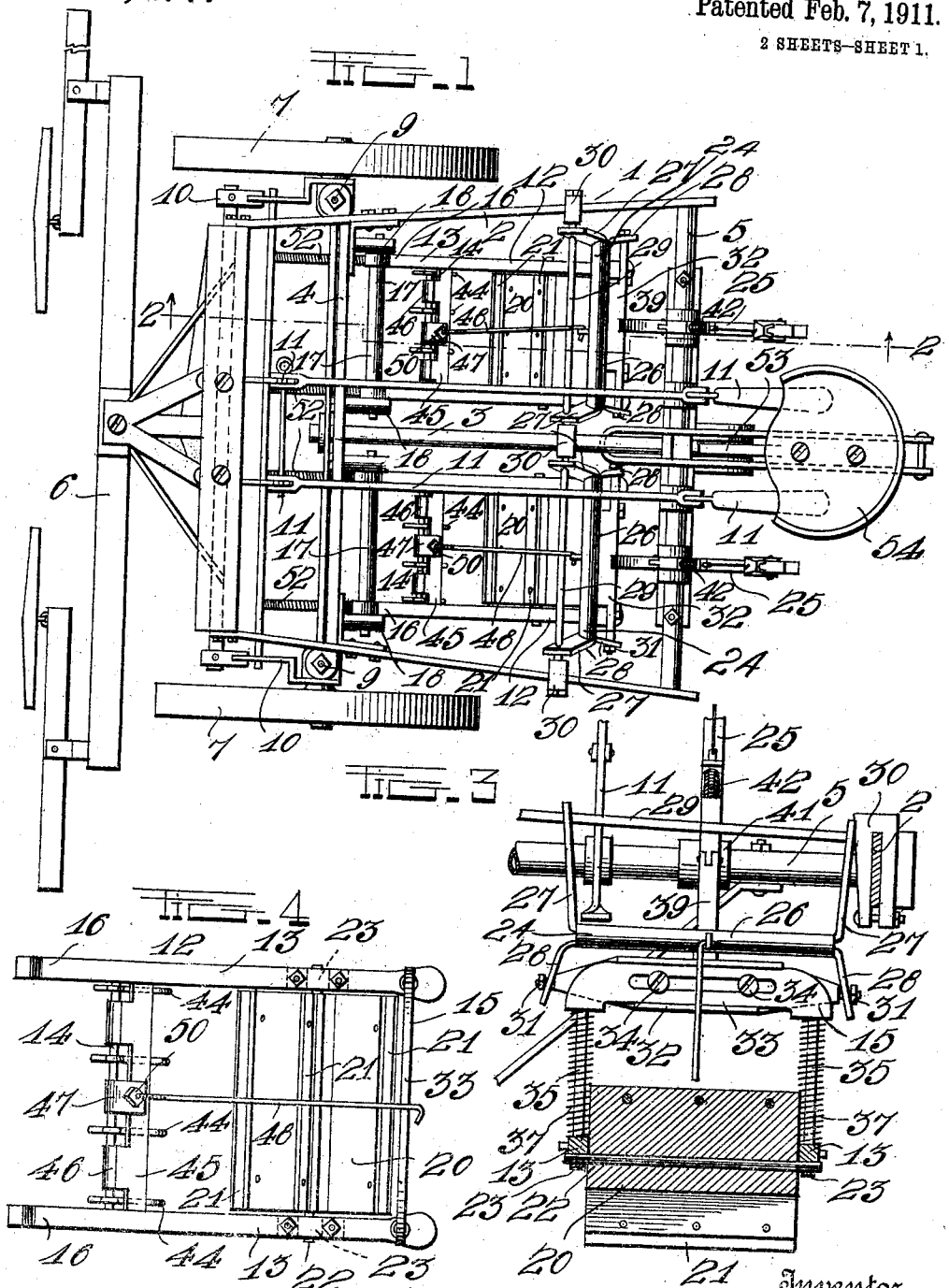

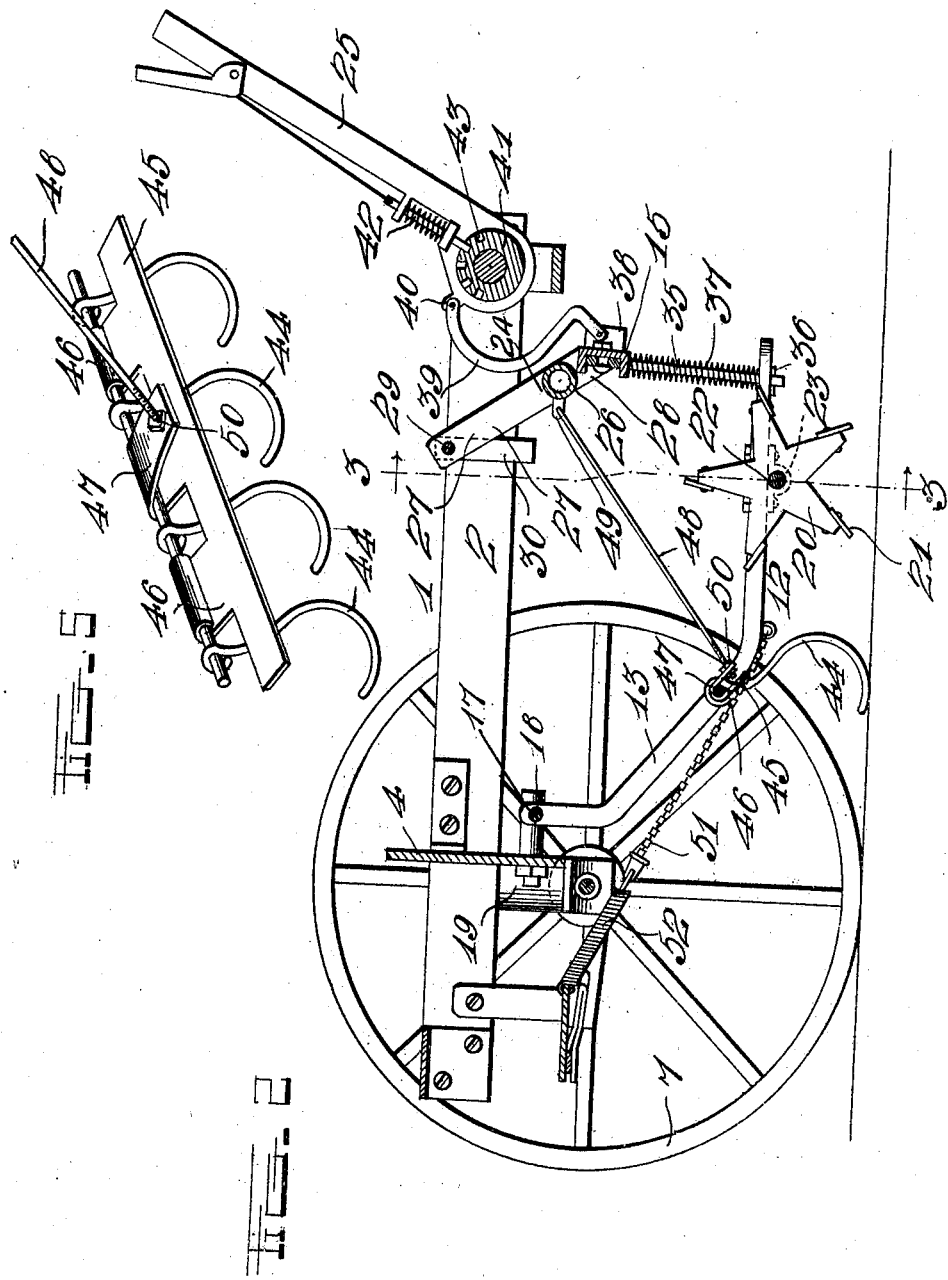

WILLIAM A. J. BROWN, OF LANCASTER, KANSAS.

STALK-CHOPPER.

983,477.

Specification of Letters Patent.  Patented Feb. 7, 1911.

Application filed October 10, 1910.  Serial No. 586,315.

*To all whom it may concern:*

Be it known that I, WILLIAM A. J. BROWN, a citizen of the United States, residing at Lancaster, in the county of Atchison and State of Kansas, have invented certain new and useful Improvements in Stalk-Choppers; and I do declare the following to be a full, clear, and exact description of the invention, such as will enable others skilled in the art to which it appertains to make and use the same.

This invention relates to improvements in stalk chopping devices and it consists in the novel construction, combination and arrangement of parts hereinafter described and claimed.

In the accompanying drawings:—Figure 1 is a plan view of a stalk chopping machine embodying my invention; Fig. 2 is a detail vertical longitudinal section taken on the plane indicated by the line 2—2 in Fig. 1; Fig. 3 is a detail transverse section through one side of the machine, the plane of the section being indicated by the line 3—3 in Fig. 2; Fig. 4 is a plan view of one of the frames which carry the chopping wheels and stalk straightening device; and Fig. 5 is a detail perspective view of a series of stalk straightening devices.

Referring more particularly to the drawings, 1 denotes a suitable main frame consisting of longitudinal side bars 2 and a central bar 3 connected by front and rear transverse bars or members 4 and 5. The frame may be suitably braced and to its front end may be connected a suitable draft device 6. The front portion of the frame is supported by two steering wheels 7 having stub axles carried by vertical pivots 9 which latter are connected by suitable connections 10 whereby the wheels will turn in unison and said connections may have any suitable means for actuating them, the actuating means being indicated at 11. Since these devices form no part of the present invention, it is thought that a more detailed explanation of them is unnecessary.

The present invention resides in the stalk chopping devices and consists in substantially rectangular frames 12 arranged beneath the two sides of the main frame and each consisting of angular side bars 13 having their intermediate portions connected by a cross rod 14 and their rear ends connected by an inverted U-shaped yoke 15. The forward ends of the bars 13 extend upwardly, as shown at 16, and are apertured to receive transverse pivot shafts 17 mounted in brackets 18 on the front cross bar. The brackets 18 have reduced forward ends passed through the bar 4 and are threaded to receive a retaining nut 19 whereby said brackets are removably mounted.

Within each of the frames 12 is mounted a stalk chopping wheel 20 having a solid body of star shape in cross section and carrying a chopping blade 21 on each of its radiating arms. The wheel 20 is mounted on a transverse shaft 22 journaled in bearings 23 on the horizontal rear portions of the bars 13.

For the purpose of adjusting the frames 12, their rear yoke members 15 are connected to swinging members or brackets 24 and said yoke members are raised or lowered by means of hand levers 25. One of the brackets 24 is provided for each of the frames 12 and each one consists of a tubular bar 26 having at its ends pairs of upper and lower arms 27 and 28. The upper arms 27 swing from transverse pivot rods 29 mounted in suitable bearing brackets 30 on the central and side bars of the main frame. The depending arms 28 are apertured to receive pivots 31 formed on the reduced ends of transverse channel bars 32, the central portions of which latter are provided with spaced upper and lower flanges to form channels for the reception of the flat portions 33 of the U-shaped yoke members 15. Said portions 33 of the yoke members or bars 15 are longitudinally slotted to receive screws or similar fastenings 34 whereby the yoke members 15 may be adjusted longitudinally of the channel bars 32 for the purpose of varying the space between the two chopping wheels. The depending ends 35 of the yoke members or bars 15 are reduced and have their lower extremities slidably arranged in openings in the rear ends of the side bars 13, cotter pins 36 being provided to prevent the bars 13 from dropping off of the reduced ends 35. Coiled springs 37 are arranged on the reduced ends 35 and bear against the side bars 13 to yieldably press the frames 12 in a downward direction.

Provided on the intermediate portions of the channel bars 32 are lugs 38 which are connected by links 39 to lugs 40 on the lower ends of the hand levers 25. The levers 25 are rotatably mounted on sleeves 41 fixed to a cross bar 5 and are held in adjusted position by spring pressed hand retracted pawls 42 which engage sockets 43 formed in the sleeve 41 as shown in Fig. 2.

For the purpose of straightening fallen or bent stalks before they are chopped by the wheels 20, I provide a series of resilient straightening teeth 44. These teeth are pivotally mounted on the cross rods 14 and are held in position and pressed downwardly by a transverse tension member 45, the latter being constructed of resilient material and having forwardly projecting arms 46 coiled to form eyes which surround the rod 14 whereby said member 45 is pivotally mounted. At the center of the member 45 is formed a resilient angular arm 47 having an aperture to receive the lower end of a rod 48, the upper end of which latter is pivotally connected to a lug 49 on the bar 26. Nuts 50 are provided on the lower ends of the rod 48 above and below the arm 47 to provide an adjustable connection for varying the tension of the member 45 of the teeth 44.

If desired, the side bars 13 may be connected by chains 51 and springs 52 to the front portion of the frame, (see Fig. 2).

The rear portion of the main frame may be supported in any suitable manner but an ordinary caster wheel is preferably employed, the same being indicated at 53 in Fig. 1. A suitable transverse seat 54 is also mounted on the rear portion of the main frame.

I claim:—

1. The combination of a wheeled frame, rectangular chopping wheel frames arranged beneath the side portions of the main frame and having their forward ends pivotally mounted, stalk chopping wheels arranged in the last mentioned frames, spring stalk straightening teeth arranged in advance of said wheels, swinging brackets mounted in the rear portions of the main frame and having spaced depending end portions, transverse channel bars having pivots at their ends mounted in said depending end portions of the swinging brackets, the intermediate portions of said channel bars having spaced flanges, inverted U-shaped yoke members having flat slotted central portions adjustably arranged in the channel bars between their flanges, the ends of said U-shaped yoke members having reduced depending ends slidably engaged with the rear portions of the chopping wheel carrying frames, springs on the reduced depending ends of said yoke members and bearing against said chopping wheel carrying frames, fastenings passed through the slots in the hinged portions of the yoke members and into said channel bars, and means for raising and lowering said channel bars.

2. The combination of a wheeled main frame, a chopping wheel carrying frame having its forward end pivotally mounted in the main frame, a chopping wheel mounted on said chopping wheel carrying frame, a swinging bracket mounted on the rear portions of the main frame, a transverse bar carried by the lower end of said swinging bracket, a yoke member connected to said bar and having depending ends slidably engaged with said chopping wheel carrying frame, springs on said yoke member and bearing against said chopping wheel carrying frame, and means for raising and lowering said transverse bar.

3. The combination of a main frame, a chopping wheel carrying frame pivotally mounted thereon and including a cross rod, means for raising and lowering the main portion of said chopping wheel carrying frame, a series of stalk straightening teeth pivotally mounted on said rod, a transverse tension member pivotally connected to said rod and engaged with said teeth, said tension member having an angular resilient arm and a rod adjustably connected to the latter and connected to said means for raising and lowering the chopping wheel carrying frame.

In testimony whereof I have hereunto set my hand in presence of two subscribing witnesses.

WILLIAM A. J. BROWN.

Witnesses:
 JOHN M. SHUFFEDOGE,
 W. R. DANUELLAN.